(12) United States Patent
Takeda

(10) Patent No.: US 12,542,792 B2
(45) Date of Patent: Feb. 3, 2026

(54) INFORMATION EXCHANGE APPARATUS, INFORMATION EXCHANGE SYSTEM AND INFORMATION EXCHANGE METHOD

(71) Applicant: NEC Corporation, Tokyo (JP)

(72) Inventor: Shinya Takeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 135 days.

(21) Appl. No.: 18/389,349

(22) Filed: Nov. 14, 2023

(65) Prior Publication Data

US 2024/0171597 A1     May 23, 2024

(30) Foreign Application Priority Data

Nov. 21, 2022    (JP) ................................ 2022-185427

(51) Int. Cl.
     *H04L 9/40*          (2022.01)

(52) U.S. Cl.
     CPC ........ *H04L 63/1416* (2013.01); *H04L 63/102* (2013.01)

(58) Field of Classification Search
     CPC ............. G06F 11/1464; G06F 11/3688; G06F 13/4063; H04L 63/123; H04L 63/0281; H04L 65/75; H04L 47/12; H04L 63/1425
     See application file for complete search history.

(56) References Cited

U.S. PATENT DOCUMENTS

| | | | |
|---|---|---|---|
| 10,503,610 B1 * | 12/2019 | Shemer | G06F 11/1464 |
| 2005/0086538 A1 | 4/2005 | Kubota | |
| 2011/0047627 A1 * | 2/2011 | Sheymov | H04L 63/1425 726/26 |
| 2015/0264057 A1 * | 9/2015 | Mevec | H04L 63/123 726/22 |

(Continued)

FOREIGN PATENT DOCUMENTS

| | | |
|---|---|---|
| JP | 2008-065659 A | 3/2008 |
| JP | 2016-032258 A | 3/2016 |

(Continued)

OTHER PUBLICATIONS

Hitachi Advanced Systems Corporation "Physical Secure Exchanger", [online], [searched: Oct. 11, 2023], <URL:https://www.hitachi-as.co.jp/products/solution/security/pse.html>, pp. 1-2.

*Primary Examiner* — Dustin Nguyen
(74) *Attorney, Agent, or Firm* — Sughrue Mion, PLLC

(57) ABSTRACT

An information exchange apparatus disposed at a closed network side, includes: a reception part that accepts to register transmission data to a closed side shared storage, the transmission data being transmitted from the closed network to an open network; a management part that drafts a transmission plan of the transmission data registered; and a transmission part that stores the transmission data registered in an open side shared storage according to the transmission plan, the open side shared storage being disposed at the open network side. The open network is a network in which an (Continued)

access source is not limited. The closed network has an air gap relative to the open network and is a network in which an access source is limited. A priority for transmission timing is set on the transmission data registered in the closed side shared storage. The management part drafts the transmission plan considering the priority.

11 Claims, 9 Drawing Sheets

(56) References Cited

U.S. PATENT DOCUMENTS

| | | | | |
|---|---|---|---|---|
| 2020/0342135 | A1* | 10/2020 | Kulkarni | G06F 11/3688 |
| 2020/0371979 | A1* | 11/2020 | Kalevo | G06F 13/4063 |
| 2021/0226929 | A1* | 7/2021 | Kiyanclar | H04L 63/0281 |
| 2022/0286441 | A1* | 9/2022 | Kuehnel | H04L 65/75 |
| 2023/0198903 | A1* | 6/2023 | Ponnuswamy | H04L 47/12 |
| | | | | 370/235 |

FOREIGN PATENT DOCUMENTS

| | | | |
|---|---|---|---|
| WO | 03/100619 | A1 | 12/2003 |
| WO | 2018/008605 | A1 | 1/2018 |

* cited by examiner

| 221a | 221b | 221c | 221d | 221e | 221f | 221g | 221h | 221i |
|---|---|---|---|---|---|---|---|---|
| DATA NUMBER | REGISTRATION DATE AND TIME | FILE NAME | FILE SIZE | PRIORITY | TRANSMISSION SCHEDULED DATE AND TIME | TRANSMISSION COMPLETION DATE AND TIME | ACCESS RIGHT | HOLDING PERIOD |
| C001 | 11:00 | AAA | | LOW | | | | |
| C002 | 11:10 | BBB | | LOW | | | | |
| ... | | | | | | | | |
| C00n | 11:30 | CCC | | HIGH | | | | |

| 214a | 214b |
|---|---|
| TRANSMISSION SCHEDULED DATE AND TIME | TRANSMISSION SCHEDULED DATA |
| 12:00 | C001, C002, |
| 13:00 | .... |
| ... | ... |

| 214a | 214b |
|---|---|
| TRANSMISSION SCHEDULED DATE AND TIME | TRANSMISSION SCHEDULED DATA |
| 11:31 | C00n |
| 12:00 | C001, C002, |
| 13:00 | .... |
| ... | ... |

| 214a | 214b |
|---|---|
| TRANSMISSION SCHEDULED DATE AND TIME | TRANSMISSION SCHEDULED DATA |
| 12:00 | C00n, C001, ... |
| 13:00 | C002, .... |
| ... | ... |

| 215a | 215b | 215c | 215d |
|---|---|---|---|
| FILE NAME | FILE SIZE | ACCESS RIGHT | HOLDING PERIOD |

| | | | | | 321 |
|---|---|---|---|---|---|
| 321a | 321b | 321c | 321d | 321e | 321f |
| DATA NUMBER | RECEPTION DATE AND TIME | FILE NAME | FILE SIZE | ACCESS RIGHT | HOLDING PERIOD |
| Op007 | 11:31 | CCC | | ID01 | |
| Op008 | 12:00 | AAA | | ID02 | |
| Op009 | 12:00 | AAA | | ID02 | |
| ... | | | | | |

| | | | | | ID01 |
|---|---|---|---|---|---|
| 321a | 321b | 321c | 321d | 321f | 321g |
| DATA NUMBER | RECEPTION DATE AND TIME | FILE NAME | FILE SIZE | HOLDING PERIOD | ACCESS RECORD |
| Op007 | 11:31 | CCC | | | |

| | | | 314 |
|---|---|---|---|
| 314a | 314b | 314c | 314d |
| ACCESS DATE AND TIME | ACCESS AREA | ACCESS PERSON (ACCESS TERMINAL) | PROPRIETY |
| | | | |
| | | | |

FIG. 9A

| DATA NUMBER | REGIS-TRATION DATE AND TIME | FILE NAME | FILE SIZE | PRIORITY | TRANS-MISSION SCHEDULED DATE AND TIME | TRANS-MISSION COMPLETION DATE AND TIME | ACCESS RIGHT | HOLDING PERIOD | ACCESS RECORD |
|---|---|---|---|---|---|---|---|---|---|
| C001 | 11:00 | AAA | | LOW | | | | | |
| C002 | 11:10 | BBB | | LOW | | | | | |
| ... | | | | | | | | | |
| C00n | 11:30 | CCC | | HIGH | | | | | |

| TRANSMISSION SCHEDULED DATE AND TIME | TRANSMISSION SCHEDULED DATA |
|---|---|
| 12:00 | C001, C002, |
| 13:00 | .... |
| ... | ... |

| TRANSMISSION SCHEDULED DATE AND TIME | TRANSMISSION SCHEDULED DATA |
|---|---|
| 11:31 | C00n, C001 |
| 12:00 | C002, ... |
| 13:00 | .... |
| ... | ... |

| TRANSMISSION SCHEDULED DATE AND TIME | TRANSMISSION SCHEDULED DATA |
|---|---|
| 11:31 | C00n, C001 |
| 12:31 | C002, ... |
| 13:31 | .... |
| ... | ... |

214a 214b — 214

INFORMATION EXCHANGE APPARATUS, INFORMATION EXCHANGE SYSTEM AND INFORMATION EXCHANGE METHOD

FIELD

Cross Reference to Related Applications

This application is based upon and claims the benefit of the priority of Japanese patent application No. 2022-185427, filed on Nov. 21, 2022, the disclosure of which is incorporated herein in its entirety by reference thereto.

This invention relates to an information exchange technology between a closed environment and an open environment.

BACKGROUND

In order to protect important information assets, there are technologies that physically isolate computers and networks to be secured from networks (open network) such as the Internet and insecure LANs, and place them in a closed environment. This technology is used primarily in government, military, and financial application. Removable media such as removable disks and USB flash drives are used to exchange data between networks separated into an open environment and a closed environment.

However, removable media can be lost. They are also inefficient to work with. To solve this issue, for example, there is a technology that places an exchange device between an open environment and a closed environment, which are physically separated, and exchanges information without human intervention (see, for example, Non-Patent Literature 1).

Non-Patent Literature: Hitachi Advanced Systems Corporation "Physical Secure Exchanger" [online] searched on Oct. 11, 2022 on the internet <URL: https://www.hitachi-as.co.jp/products/solution/security/pse.html>

SUMMARY

The following analysis is given by the present inventor.

In the technology disclosed in Non-Patent Literature 1, the timing of information exchange is pre-determined by time and capacity. Therefore, it is difficult and inconvenient to deal with irregular or unforeseen situations.

The present invention is made in view of the above circumstances. It is an object of the present invention to provide a technology to improve convenience of information exchange between a closed environment and an open environment.

According to a first aspect of the present invention, there is provided an information exchange apparatus, including a reception part that accepts to register transmission data to a closed side shared storage, the transmission data being transmitted from the closed network to an open network;

It further includes a management part that drafts a transmission plan of the transmission data registered.

It further includes a transmission part that stores the transmission data registered in an open side shared storage according to the transmission plan, the open side shared storage being disposed at the open network side.

The open network is a network in which an access source is not limited. The closed network has an air gap relative to the open network and is a network in which an access source is limited.

A priority for transmission timing is set on the transmission data registered in the closed side shared storage.

The management part drafts the transmission plan considering the priority.

According to a second aspect of the present invention, there is provided an information exchange system including the information exchange apparatus described above.

It further includes an open side information exchange apparatus disposed at an open network system side.

It further includes an access right that specifies a target entity to which access to the transmission data is allowed is further set for the transmission data to be registered.

The open side information exchange apparatus includes an open side management part that controls an access for the transmission data stored in the open side shared storage, in accordance with the access right.

According to a third aspect of the present invention, there is provided an information exchange method. Information is exchanged between a closed network and an open network executed by one or more computers.

The method includes drafting a transmission plan for a transmission data registered in a closed side shared storage disposed at the closed network side, the closed side shared storage being registered with the transmission data to be transmitted from the closed network to the open network.

It further includes storing the transmission data to an open side shared storage disposed at the open network side, in accordance with the transmission plan.

The open network is a network in which an access source is not limited. The closed network has an air gap relative to the open network and is a network in which an access source is limited.

A priority for transmission timing is set on the transmission data registered in the closed side shared storage.

The transmission plan is drafted on a basis of the priority.

According to a fourth aspect of the present invention, there is provided a non-transitory computer-readable medium storing a program causing a computer disposed at a closed network side to execute processings including: drafting a transmission plan for a transmission data registered in a closed side shared storage disposed at the closed network side, the closed side shared storage being registered with the transmission data to be transmitted from the closed network to the open network.

It further includes storing the transmission data to an open side shared storage disposed at the open network side, in accordance with the transmission plan.

The open network is a network in which an access source is not limited. The closed network has an air gap relative to the open network and is a network in which an access source is limited.

A priority for transmission timing is set on the transmission data registered in the closed side shared storage.

The transmission plan is drafted on a basis of the priority. This program can be recorded in a computer-readable (non-transitory) storage medium. The storage medium can be non-transitory one, such as a semiconductor memory, a hard disk, a magnetic recording medium, an optical recording medium, and so on. The present invention can be implemented as a computer program product.

According to the present invention, it improves convenience of information exchange between a closed environment and an open environment.

BRIEF DESCRIPTION OF DRAWINGS

FIG. 3A is a diagram illustrating an example of management items of data registered in a CL shared storage according to one example embodiment of the present invention.

FIG. 3B is a diagram illustrating an example of a transmission plan according to one example embodiment of the present invention.

FIG. 3C is a diagram illustrating an example of a transmission plan according to one example embodiment of the present invention.

FIG. 3D is a diagram illustrating an example of a transmission plan according to one example embodiment of the present invention.

FIG. 3E is a diagram illustrating an example of header items of a transmission data according to one example embodiment of the present invention.

FIG. 9A is a diagram illustrating an example of management items of a registered data of a CL shared storage according to a variation of one example embodiment of the present invention.

FIG. 9B is a diagram illustrating an example of a transmission plan according to a variation of one example embodiment of the present invention.

FIG. 9C is a diagram illustrating an example of a transmission plan according to the variation of one example embodiment of the present invention.

FIG. 9D is a diagram illustrating an example of a transmission plan according to the variation of one example embodiment of the present invention.

EXAMPLE EMBODIMENTS

Figure 1:
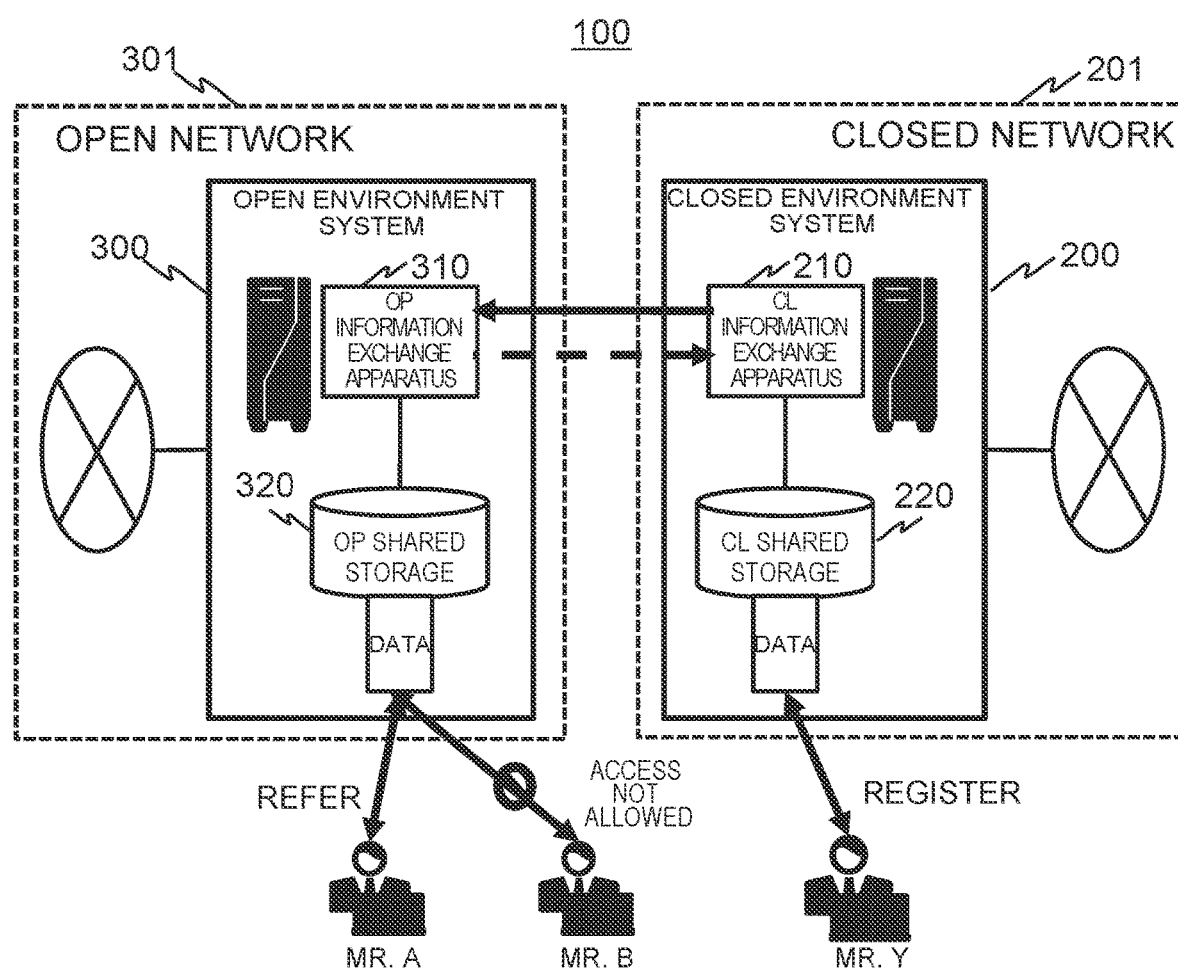
FIG. 1 is a drawing illustrating an outline of an information exchange system according to one example embodiment of the present invention.

Hereinafter, an example embodiment of the present invention (hereinafter referred to as a present example embodiment) will be described with reference to the drawings. It should be noted that drawing reference signs in the outline are given to each element for convenience as an example to facilitate understanding and are not intended to limit the present invention to the illustrated modes. Further, connection lines between blocks in the drawings referred to in the following description can be both bidirectional and unidirectional. A unidirectional arrow schematically shows the main flow of a signal (data) and does not exclude bidirectionality.

A program is executed by a computer apparatus, and the computer apparatus is provided with, for example, a processor, a storage device, an input device, a communication interface, and a display device as needed. Further, the computer apparatus is configured to be able to perform wired or wireless communication with an internal device therein or with an external device (including a computer) via the communication interface. Although input/output connection points of each block in the drawings have ports or interfaces, these are not illustrated. Further, in the following description, "A and/or B" means at least one of A and B.

First, an outline of an information exchange system 100 of the present example embodiment will be described. FIG. 1 illustrates an overall view of the information exchange system 100 of the present example embodiment will be described.

As illustrated FIG. 1, the information exchange system 100 of the present example embodiment is provided with a closed environment system 200 and an open environment system 300.

The open environment system 300 is a system disposed in an open network 301, in which an access source is generally not limited. The open environment system 300 is a system that can be accessed from an external network such as the Internet.

The closed environment system 200 is a system disposed in a closed network 201, in which an access source is generally limited. The closed network 201 is, for example, an internal LAN (Local Area Network), etc. In the present example embodiment, the closed environment system 200 is configured to be inaccessible from the outside (e.g., via Wide Area Network (WAN)). The closed network 201 is, generally, physically cut off (isolated) from the open network 301, and is protected by a so-called air gap. The closed environment system 200 is used, for example, to manage information relating to individuals, including personnel information.

In the information exchange system 100 of the present example embodiment, information (data) is periodically exchanged (transmitted and received) between the closed environment system 200 and the open environment system 300. Further, in the present example embodiment, necessary information (data) can be transmitted from the closed environment system 200 to the open environment system 300 at a desired timing. This means that the information exchange system 100 of the preset example embodiment, normal data is periodically transmitted and received from each other, for example, at predetermined time intervals. On the other hand, urgent data registered in the closed environment system 200 is transmitted to the open environment system 300 immediately after registration.

In the information exchange system 100 of the preset example embodiment, security is also ensured by performing access restriction to transmitted data. For example, if the information exchange system 100 receives an urgent request for personal information from an external party, it will process (or treat) the data as urgent data with access restrictions to be transmitted to the open environment system 300.

The details of the present example embodiment that achieves above are described below.

[Closed Environment System]

As illustrated in FIG. 1, the closed environment system 200 is provided with a closed environment system information exchange apparatus (closed side information exchange apparatus) 210 and a closed environment system shared storage (closed side shared storage) 220. Hereinafter, the closed environment system information exchange apparatus 210 is referred to as a CL information exchange apparatus 210, and the closed environment system shared storage 220 is referred to as a CL shared storage 220.

As illustrated in FIG. 1, the open environment system 300 is provided with an open environment system information exchange apparatus (open side information exchange apparatus) 310 and an open environment system shared storage (open side shared storage) 320. Hereinafter, the open environment system information exchange apparatus 310 is referred to as an OP information exchange apparatus 310, and the open environment system shared storage 320 is referred to as an OP shared storage 320.

Data to be transmitted to the open environment system 300 among data in the closed environment system 200 is registered in the CL shared storage 220. For example, it is data such as the personal information described above, which is transmitted to the open environment system 300 and disclosed.

The CL information exchange apparatus 210 accepts data to be transmitted to the open environment system 300 from a user (Mr. Y, in FIG. 1) and registers it in the CL shared storage 220. The CL information exchange apparatus 210 also transmits data registered in the CL shared storage 220 to the open environment system 300 according to a predetermined algorithm.

Figure 2:
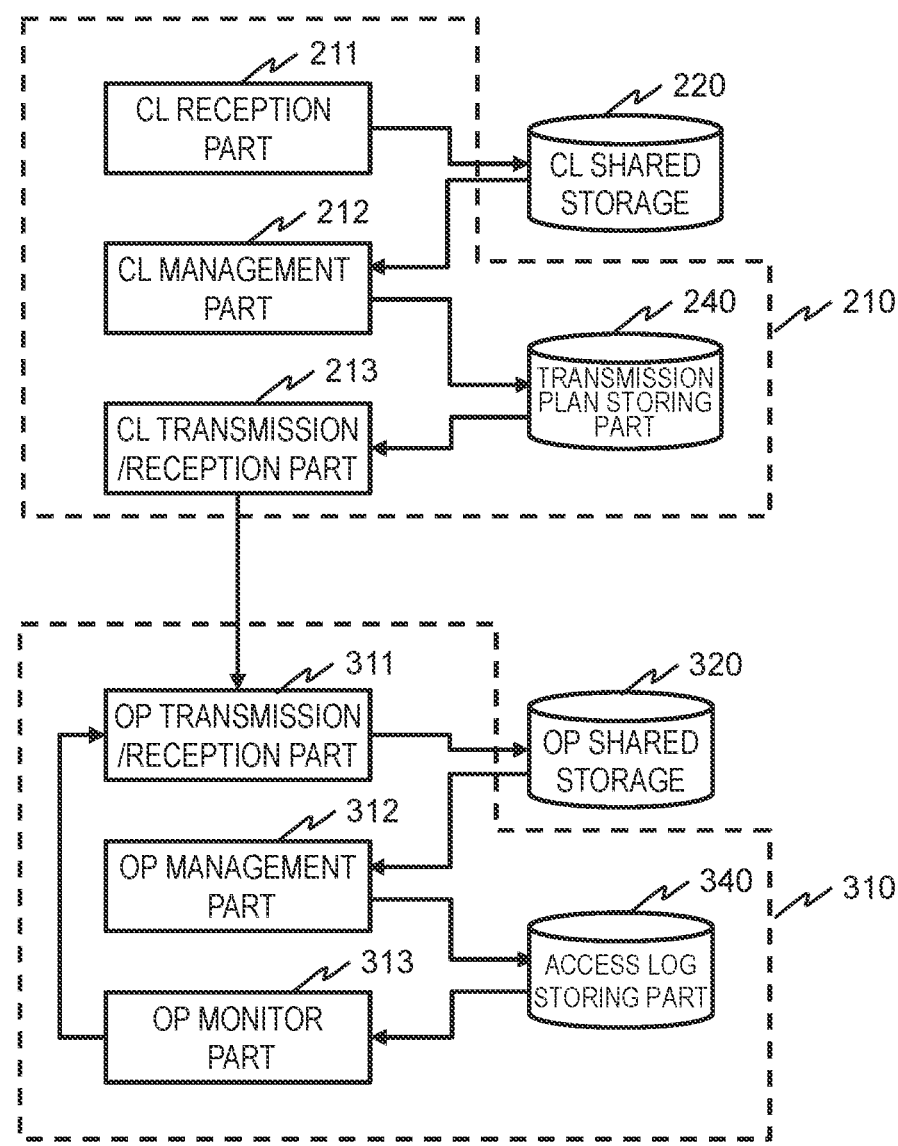
FIG. 2 is an example of a functional block diagram of a CL information exchange apparatus and an OP information exchange apparatus according to one example embodiment of the present invention.

To achieve this, the CL information exchange apparatus 210 is provided with a CL reception part 211, a CL management part (closed side management part) 212, a CL transmission/reception part (transmission part) 213 and a transmission plan storing part 240, as illustrated in FIG. 2.

The CL reception part 211 accepts data to be transmitted to the open environment system 300 from a user and registers it in the CL shared storage 220. Then, the CL reception part 211 notifies the CL management part 212 that the data has registered. Management items 221 are assigned to the data registered in the CL shared storage 220 in addition to the data itself (or data body). An example of the management items 221 is illustrated in FIG. 3A.

The management items 221, which is assigned to the data registered is provided with a data number 221a, a registration date and time 221b, a file name 221c, a file size 221d, a priority 221e, a transmission scheduled date and time 221f, a transmission completion date and time 221g, an access right 221h, and a holding period 221i.

The data number 221a is a number that uniquely identifies each data. The data number 221a is assigned by the CL reception part 211 each time data is registered.

The registration data and time 221b is a date and time that the data was registered. The registration date and time 221b is assigned by the CL reception part 211 when data is accepted and registered in the CL shared storage 220.

The file name 221c is a name of the data. The priority 221e is a flag indicating whether the data is normal or urgent, and indicates the priority of the transmission timing. The access right 221h is information that specifies a target entity (person and/or terminal) to which access (browsing) is allowed (or permitted) in the open environment system 300. The holding period 221i is a period that data is held in the open environment system 300 after viewing, i.e., until the data is erased. These items are set by a user when the user registers data.

The priority 221e is set to either "high" or "low". In the present example embodiment, the data registered in the CL shared storage 220 is periodically transmitted to the open environment system 300, as described below. For data to be transmitted by a normal periodic transmission, the priority 221e is set to "low". On the other hand, for data to be transmitted urgently, the priority 221e is set to "high". It may be configured that the priority 221e is set "low" as a default value and user sets it only "high".

The access right 221h is, for example, information that specifies a specific user (e.g., user ID) when access to the data is allowed only to the specific user. The access right 221h can be, for example, information that specifies a specific terminal (e.g., terminal ID), etc. when access to the data is allowed only from the specific terminal. Note that more than one access rights 221h may be set. Also, the access right 221h may be set for each unit, such as a department.

For the holding period 221i, a default value may be predetermined that is used when it is not set by the user.

The file size 221d is a size (data volume) of the data. For example, when the data is accepted, the CL reception part 211 calculates the size of the data and registers it as the file size 221d.

The transmission scheduled date and time 221f is a date and time when the data is scheduled to be transmitted to the open environment system 300. The transmission scheduled date and time 221f is registered in accordance with a transmission plan drafted by the CL management part 212 described below.

The transmission completion date and time 221g is a date and time when the data was transmitted to the open environment system 300. The transmission completion date and time 221g is registered when the data is transmitted by the CL transmission/reception part 213 described below.

The user may select data to be transmitted to the open environment system 300 from data already registered in other storage (not shown) in the closed environment system 200. In this case, the user specifies a file name of the data registered in other storage, and registers the priority 221e, the access right 221h, and the holding period 221i for the data.

In this case, the date and time when the user selected the data are registered as the registration date and time 221b. For the file name 221c and the file size 221d, the information already registered for the data are used.

The CL management part 212 manages data registered in the CL shared storage 220 and transmission thereof to the open environment system 300. The CL management part 212 drafts (or updates) a transmission plan according to a predefined algorithm, each time data is registered in the CL shared storage 220 in the present example embodiment. The CL management part 212 then notifies the CL transmission/reception part 213 that the transmission plan has been drafted.

In the present example embodiment, the CL management part 212 decides the transmission scheduled date and time 221f for each untransmitted data registered in the CL shared storage 220, as a transmission plan. The transmission plan drafted by the CL management part 212 is stored in the transmission plan storing part 240. The CL management part 212 may also draft the transmission plan when the CL information exchange apparatus 210 is activated and when transmission is resumed as described below.

The transmission plan 214 is, for example, a plan in which the data number 221a of the data to be transmitted is registered as a transmission scheduled data 214b for each scheduled transmission date and time 214a, as illustrated in FIG. 3B.

The CL management part 212 decides, for example, the transmission scheduled date and time 221f on a basis of the priority 221e for each of the data registered in the CL shared storage 220 for which the transmission completion date and time 221g is not yet registered.

The CL management part 212 drafts a transmission plan 214 for data with the priority 221e "low" to be transmitted with a periodic transmission. The periodic transmission is a processing that predetermined amount of data is transmitted at a predetermined time (regular time), periodically, as described above. In the present example embodiment, the CL management part 212 decides a transmission scheduled date and time for the data so that data is transmitted, for example, hourly, starting with the data having the earliest registration date and time 221b, up to a limit of the predetermined amount of data. The predetermined amount of data is the maximum amount of data (the amount of transmittable data) that can be transmitted in the transmission time width (or window) allowed as the periodic transmission. The amount of data that can be transmitted is determined, for example, by a transmission capability of the CL information exchange apparatus 210 and a transmission time width.

The CL management part 212 drafts a transmission plan 214 (decides a transmission scheduled date and time) for data with a priority 221e "high" so that it is transmitted immediately (promptly) after registration. The time set as immediately after registration, i.e., immediate time, is predetermined to be a very short time, for example, one minute after registration.

The CL management part 212 registers the transmission scheduled date and time decided, as the transmission scheduled date and time 221f of the data.

Hereinafter, drafting a transmission plan 214 by the CL management part 212 is concretely explained. Here, for example, it is assumed that a data transmission timing for the periodic transmission is every hour and that if data with a priority 221e "high" is registered, the data will be transmitted one minute thereafter.

FIG. 3B illustrates a transmission plan 214 drafted before data with a data number 221a "C00n", illustrated in FIG. 3A, is registered. Assume that data with the data number 221a "C00n" is registered with priority 221e "high" at time 11:30. The CL management part 212 drafts (updates) the transmission plan 214 so as to transmit the data of "C00n" at a time immediately after registration, i.e., at 11:31, as illustrated in FIG. 3C.

For example, if the transmission plan 214 is drafted as illustrated in FIG. 3B, and the data of "C00n" is registered at 11:59, just before the periodic transmission time (regular time), the CL management part 212 adds the data of "C00n" to the transmission scheduled date and time 214a of 12:00, as illustrated in FIG. 3D. Then, according to the file size 221d, the CL management part 212 moves the data that was originally scheduled to be transmitted at 12:00 to the periodic transmission at 13:00 (the transmission scheduled date and time 214a of 13:00). Similarly, the CL management part 212 will be updated for subsequent periodic transmissions.

The CL transmission/reception part 213 transmits data to the open environment system 300 according to the transmission plan 214 drafted by the CL management part 212 in the present example embodiment. In the present example embodiment, the CL transmission/reception part 213 accesses the transmission plan 214, for example, each time the CL management part 212 updates the transmission plan 214 and/or at predetermined time intervals, to check to see whether or not the current date and time are registered as a transmission scheduled date and time 214a. If registered, the CL transmission/reception part 213 obtains data having a data number registered as the transmission scheduled data 214b from the CL shared storage 220, generates a transmission data and transmits the same.

Here, as a transmission, the CL transmission/reception part 213, for example, opens a network to the open environment system 300 using an application, and stores the transmission data in a temporary area in the OP shared storage 320, described below. Concretely, the CL transmission/reception part 213 controls a switching device such as a relay on a communication line between the open environment system 300 to be in a connected state and stores data in the temporary area.

The CL transmission/reception part 213 registers the date and time of transmission in the transmission completion date and time 221g of the data transmitted in the CL shared storage 220 after transmission.

Here, an example of header items 215 of transmission data generated by the CL transmission/reception part 213 is illustrated in FIG. 3E. As illustrated in the FIG. 3E, the header items 215 are provided with file name 215a, file size 215b, access right 215c, and holding period 215d.

The CL transmission/reception part 213 extracts at least these items from the CL shared storage 220 for each data to be transmitted and makes them the header items 215 thereof to generate the transmission data. Then, the CL transmission/reception part 213 transmits the transmission data generated to the open environment system 300.

[Open Environment System]

Next, each configuration of the open environment system 300 is described. In the open environment system 300 of the present example embodiment, when the OP information exchange apparatus 310 receives a transmission data from the closed environment system 200, it registers management items in the OP shared storage 320. Then, the OP information exchange apparatus 310 allows access from a user according to the access right 215c set in the header items 215 of the transmission data. For example, in an example illustrated in FIG. 1, the OP information exchange apparatus 310 allows an access from Mr. A (Mr. A can refer to the data), and does not allow an access from Mr. B.

In the present example embodiment, the OP information exchange apparatus 310 also constantly monitors access to the OP shared storage 320 and records them as access logs. The OP information exchange apparatus 310 determines whether or not the access is unauthorized, and if it determines that the access is unauthorized, it stops (or suspends) transmitting and receiving data to and from the closed environment system 200.

A functional structure of the OP information exchange apparatus 310 that achieves this is illustrated in FIG. 2. The OP information exchange apparatus 310 in the present example embodiment is provided with an OP transmission/reception part 311, an OP management part (open side management part) 312, an OP monitor part 313, and an access log storing part 340.

Figures 4A, 4B, 4C, 4D:
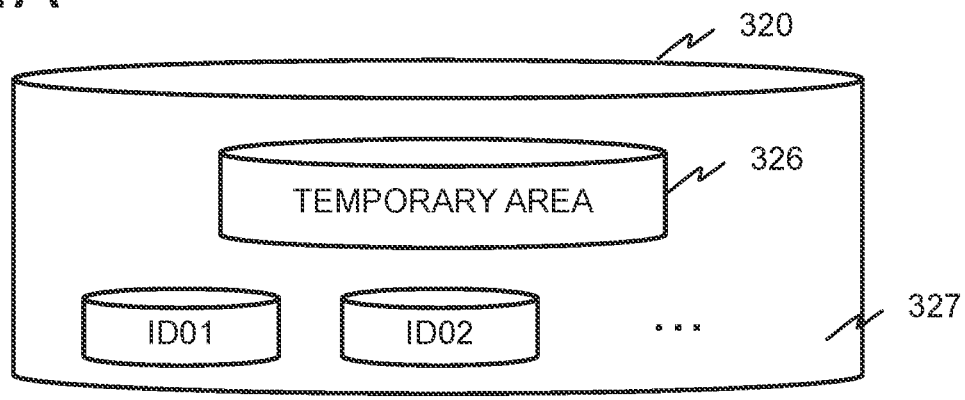
FIG. 4A is a diagram illustrating an OP shared storage according to one example embodiment of the present invention.
FIG. 4B is a diagram illustrating an example of management items of a registered data of the OP shared storage according to one example embodiment of the present invention.
FIG. 4C is a diagram illustrating an example of management items of a registered data of the OP shared storage according to one example embodiment of the present invention.
FIG. 4D is a diagram illustrating an example of an access log according to one example embodiment of the present invention.

The OP shared storage 320, as illustrated in FIG. 4A, is provided with a temporary area 326 in which data transmitted from the closed environment system 200 is temporarily stored and an access restriction area(s) 327 that restricts the access source. The access restriction area(s) 327 is provided, for example, for each information that specifies the access right 215c, which is registered in the header items 215 of the transmission data. Each access restriction area 327 is set so that it can only be accessed by a user or a terminal which has a predetermined access right (ID).

Note that there does not have to be a one-to-one correspondence between individual access restriction areas 327 and the IDs that are allowed access. Multiple IDs may be set as IDs that are allowed to access to a single access restriction area 327, or a single ID may be set as an ID that is allowed to access to multiple access restriction areas 327.

The OP transmission/reception part 311 registers management items 321 when data is transmitted (stored in the temporary area 326) from the closed environment system 200.

An example of the management items 321 to be registered are illustrated in FIG. 4B. As illustrated in FIG. 4B, each data is registered with a data number 321a, a reception date and time 321b, a file name 321c, a file size 321d, an access right 321e, and a holding period 321f, as management items 321.

The data number 321a is information to uniquely identify each data and is registered by the OP transmission/reception part 311. The reception date and time 321b is information on a date and time that the data was received and is registered by the OP transmission/reception part 311. The file name 321c, the file size 321d, the access right 321e, and the holding period 321f are obtained from the header items 215 of the transmission data and registered by the OP transmission/reception part 311.

When the OP transmission/reception part 311 finished registering the management items 321, it transmits a notification to the OP management part 312.

The OP management part 312 manages access to data stored in the OP shared storage 320. In the present example embodiment, the OP management part 312 allows access (discloses and provides data) only for access from a user who has an access right. The OP management part 312 records the access.

In the present example embodiment, when the OP management part 312 is received the notification from the OP transmission/reception part 311, it refers to the access right 321e and moves the data transmitted, from the temporary area 326 to the access restriction area 327. At this time, the OP management part 312 moves it to a specific access restriction area 327, which is provided in correspondence with the access right 321e. Here, "move" is a processing of copying data in the temporary area 326 to the specific access restriction area 327 and then deleting the data from the temporary area 326.

For example, in an example illustrated in FIG. 4B, for the data whose data number 321a is "Op007", "ID01" is registered as the access right 321e. Therefore, the data is moved to the specific access restriction area 327, which is provided exclusively for "ID01". An access record 321g, which registers whether or not the access was made, is added as management items 321 for "ID01", as illustrated in FIG. 4C. At this time, the access right 321e may not be registered as the management items 321 for "ID01". The information on the access restriction area(s) 327 provided for each access right is to be notified to the access source in advance.

The OP management part 312 of the present example embodiment records, for example, the date and time to the access record 321g of the data stored therein when there is an access from an access source with an authorized (or legitimate) access right. Then, the OP management part 312 starts counting an elapsed time. The OP management part 312 deletes the data after a time set in the holding period 321f has elapsed. The OP management part 312 may leave the management items 321 of the data and delete only the body of the data.

The data may be deleted by the access source. This means that, a user who receives the notification accesses an access restriction area 327 designated (access restriction area 327 provided exclusively for the ID) and obtains the data. Then the used deletes it (e.g., followed by deletion).

The OP management part 312 also records access to the OP shared storage 320 as an access log 314. The access log 314 is stored in the access log storing part 340. As the access log 314, for example, an access date and time 314a, an access area 314b, an access person and/or access terminal 314c, and a propriety 314d are registered for each access, as illustrated in FIG. 4D.

In the access area 314b, the access restriction area 327 which has accessed is registered. At this time, the OP management part 312 may also record more detailed information specifying the data accessed, such as data number 321a, file name 321c, etc., of the data. In the access person and/or access terminal 314c, an ID of a user and/or an ID of a terminal of the access source (a user ID and/or a terminal ID) is registered. In propriety 314d, it is registered whether or not the access is allowed, i.e., whether or not the access person (or the access terminal) has the access right.

The OP monitor part 313 monitors an access to the OP shared storage 320 by a user or a terminal. In the present example embodiment, the OP monitor part 313 analyzes the access log 314 registered by the OP management part 312 according to a predetermined algorithm to detect an unauthorized access. Then, when the OP monitor part 313 detects an unauthorized access, it notifies the closed environment system 200 of an occurrence thereof according to a predetermined criterion. The OP monitor part 313 may use, for example, a well-known trail management system, or the like that collects event logs (syslog) recorded on the terminal itself, server, etc., and makes them into a report.

The OP monitor part 313 determines that unauthorized access is occurring, for example, if it finds that there is frequent access to an area to which an access right is not given. The predefined algorithm may, for example, be based on an Artificial Intelligence (AI) that has learned unauthorized access patterns.

When the closed environment system 200 is notified of the occurrence of unauthorized access, the CL transmission/reception part 213 stops transmitting data from the closed environment system 200 to the open environment system 300. User operation is required to resume data transmission.

The CL transmission/reception part 213 notifies the CL management part 212 of the suspension of data transmission from the closed environment system 200 to the open environment system 300 and its resumption. When the CL management part 212 receives notification that the data transmission has resumed, it re-drafts the transmission plan 214.

[Transmission Plan Drafting Processing]

Figure 5:
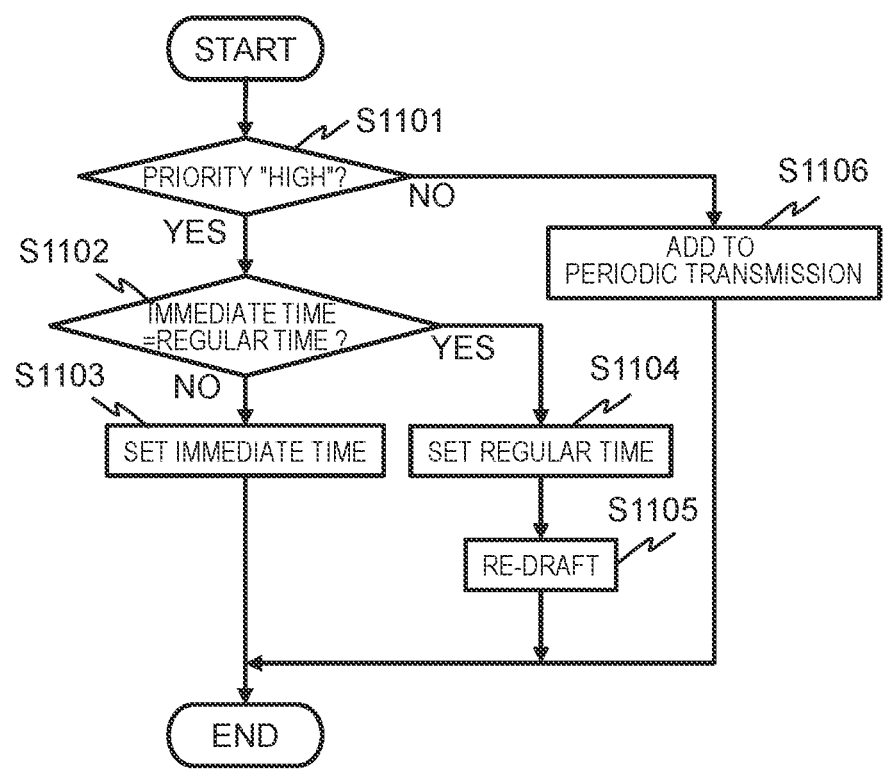
FIG. 5 is a flowchart illustrating one example of a transmission plan drafting processing according to one example embodiment of the present invention.

Next, a flow of a transmission plan drafting processing by the CL management part 212 of the CL information exchange apparatus 210 is described. FIG. 5 is a flowchart illustrating an example of a transmission plan drafting processing according to the present example embodiment. The processing is started when data is registered in the CL shared storage 220.

When data is newly registered by a user, the CL management part 212 checks the priority 221e of the data newly registered (step S1101). Then, if the priority 221e of the data is "high". the CL management part 212 sets immediate time as a transmission scheduled date and time 214a of the data.

At this time, the CL management part 212 determines whether or not the immediate time matches the date and time of the periodic transmission (regular time) (step S1102). If the immediate time does not match the regular time, the CL management part 212 sets the immediate time as the transmission scheduled date and time 214a of the data (step S1103) and terminates the processing. This means that the CL management part 212 adds the immediate time to the transmission scheduled date and time 214a of the transmission plan 214 and registers the data number 221a of the data in the transmission scheduled data 214b corresponding thereto.

On the other hand, if the immediate time matches the regular time, the CL management part 212 sets the transmission scheduled date and time 214a of the data as the regular time (step S1104). Then, the CL management part 212 re-drafts the transmission plan 214 according to the amount of data that can be transmitted (step S1105), and terminates the processing.

On the other hand, if the priority 221e of the data registered in step S1101 is other than "high", the CL management part 212 sets the transmission scheduled date and time 214a, as the periodic transmission (step S1106). For example, the CL management part 212 adds the data number 221a of the data newly registered to the transmission scheduled data 214b of the transmission scheduled date and time 214a of the periodic transmission, and terminate the processing.

When the CL information exchange apparatus 210 is activated, or when the CL management part 212 receives an instruction to resume transmission while transmission is suspended, it accesses the CL shared storage 220 and newly drafts a transmission plan 214. In this case, the CL management part 212 first extracts data for which the transmission completion date and time 221g is not yet registered. Then, the CL management part 212 checks the priority 221e of the data extracted and drafts a transmission plan 214 according to the priority 221e in a manner described above.

[Data Transmission/Reception Processing]

Figure 6:
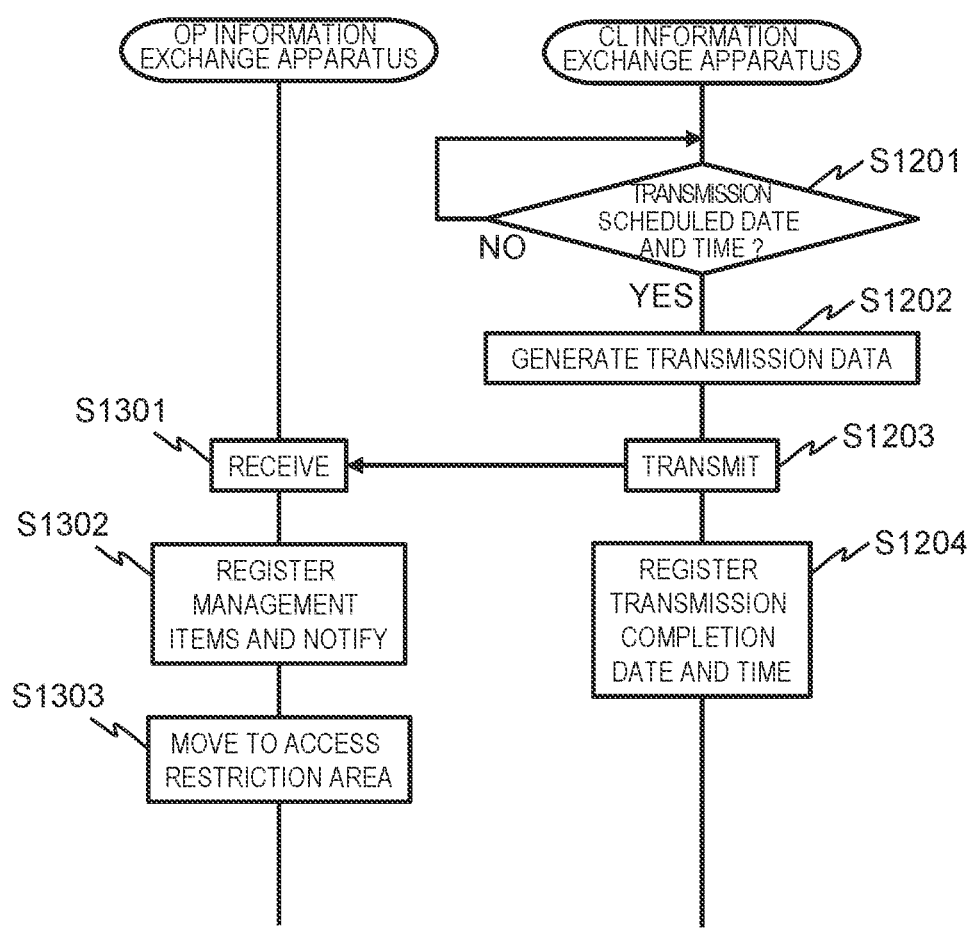
FIG. 6 is a flowchart illustrating one example of a data transmission/reception processing according to one example embodiment of the present invention.

Next, the data transmission processing from the CL information exchange apparatus 210 to the OP information exchange apparatus 310 based on the transmission plan 214 drafted by the CL management part 212 and the subsequent reception processing on the OP information exchange apparatus 310 side are described. FIG. 6 is a flowchart illustrating one example of a data transmission/reception processing according to the present example embodiment.

In the CL information exchange apparatus 210, the CL transmission/reception part 213 determines whether or not a current date and time is a transmission scheduled date and time 214a (step S1201). For example, the CL transmission/reception part 213 accesses the transmission plan 214 at predetermined time intervals to determine whether or not the current date and time is registered as the transmission scheduled date and time 214a.

If the current date and time is registered in the transmission scheduled date and time 214a, the CL transmission/reception part 213 generates the transmission data in a manner described above (step S1202) and transmits it to the open environment system 300 (step S1203). Here, the CL transmission/reception part 213 stores the transmission data in the temporary area 326 of the OP shared storage 320, as described above. Then, the CL transmission/reception part 213 registers the date and time of transmission in the transmission completion date and time 221g (step S1204).

On the open environment system 300 side, when the OP transmission/reception part 311 confirms that transmission data has been received, i.e., stored in the temporary area 326 (step S1301), it registers the management items of the transmission data. Then, the OP transmission/reception part 311 notifies it to the OP management part 312 (step S1302).

Then, the OP management part 312 moves the transmission data to the access restriction area 327 according to the access right 321e (step S1303). Then the OP management part 312 waits for access from a user.

[Access Management Processing]

Figure 7:
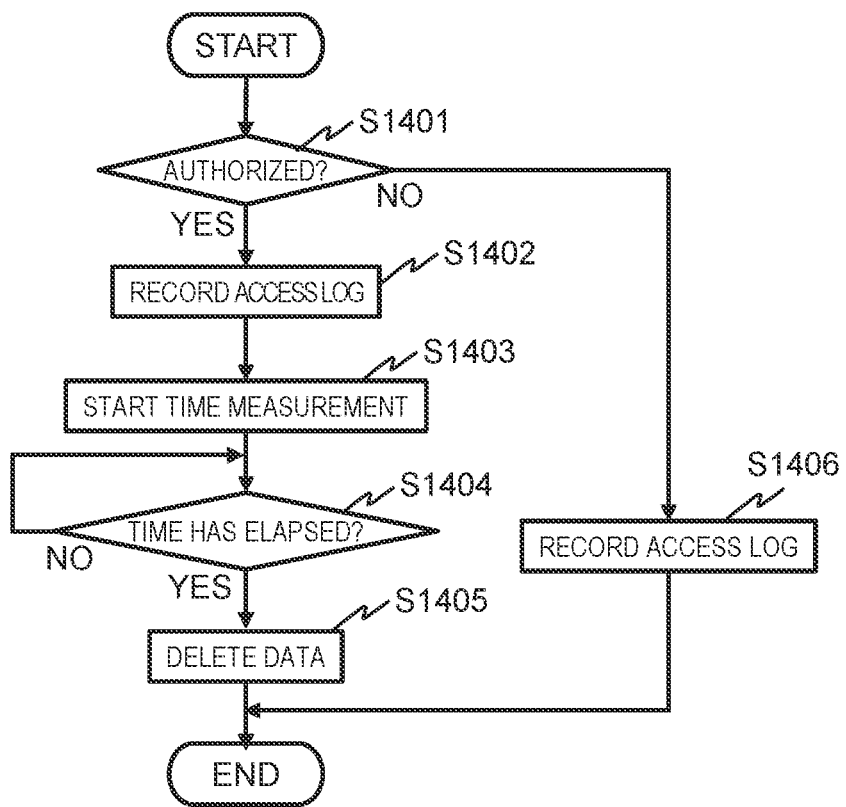
FIG. 7 is a flowchart illustrating one example of an access management processing according to one example embodiment of the present invention.

Next, an access management processing by the OP management part 312 on the open environment system 300 side is described. FIG. 7 is a flowchart illustrating an access management processing according to the present example embodiment. The processing is executed upon receiving an access from a user.

The OP management part 312 determines whether or not the access received is an authorized access (step S1401). For example, the OP management part 312 determines to be an authorized access, if an ID assigned to the access restriction area 327 of an access destination matches an ID of the access source. If it is determined to be the authorized access, the user may view, retrieve, etc., the data of the access destination.

If it is determined to be the authorized access, the OP management part 312 records it in the access log 314 (step S1402). Then, the OP management part 312 records also the access record 321g and starts measuring the time up to delete (step S1403).

Then, when the time to delete has elapsed (step S1404), the OP management part 312 deletes the data accessed, from the OP shared storage 320 (step S1405) and terminates the processing.

On the other hand, if it is not determined to be the authorized access in step S1401, the OP management part 312 records that fact (that there is an unauthorized access) in the access log 314 (step S1406) and terminates the process.

[Hardware Configuration]

Figure 8:
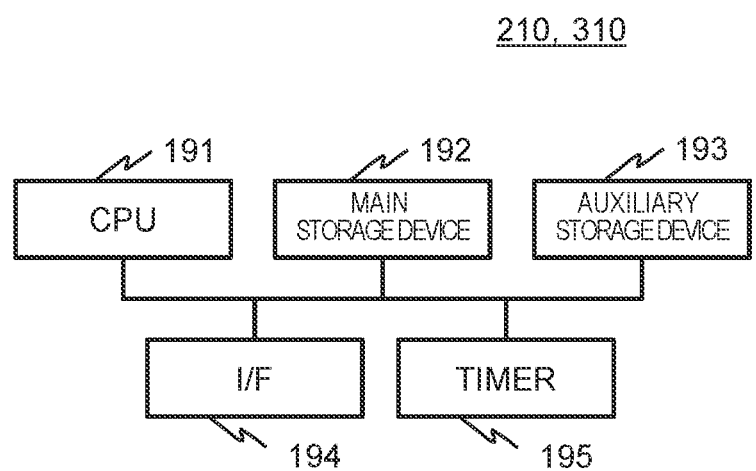
FIG. 8 is a diagram illustrating one example of a hardware configuration of an information exchange apparatus according to one example embodiment of the present invention.

The CL information exchange apparatus 210 and the OP information exchange apparatus 310 of the present example embodiment can be realized by so-called general-purpose information processing apparatus (computer). Here, both are represented by an information exchange apparatus. FIG. 8 illustrates an example of the hardware configuration of the information exchange apparatus.

The information exchange apparatus of the present example embodiment is provided with, for example, a CPU (Central Processing Unit) 191, a main storage device (memory) 192, an auxiliary storage device 193, an IF (Interface) 194, and a timer (clock) 195 to measure time, which are interconnected by an internal bus.

The CPU 191, for example, loads a program stored in the auxiliary storage device 193 into the main storage device 192 and executes it to realize each of the above functions and to control integrally the entire information exchange apparatus. One or more processors such as an MPU (Micro Processing Unit) may be used instead of the CPU 191.

The main storage device 192 is a memory such as a RAM (Random Access Memory). The main storage device 192 is a work area for the CPU 191 to process programs, etc. that the information exchange apparatus executes.

The auxiliary storage device 193 is, for example, a ROM (Read Only Memory), a HDD (Hard Disk Drive), an SDD (Solid State Drive), etc. The auxiliary storage device 193 stores therein various programs executed by the information exchange apparatus. The auxiliary storage device 193 may be provided with a storage medium such as a flexible disk, a hard disk, an optical disk, a CD-ROM, a CD-R, a magnetic tape, a non-volatile memory card, or a DVD.

The program stored in the auxiliary storage device 193 can be provided as a program product recorded on a non-transitory computer-readable storage medium (non-transitory computer-readable storage medium). The auxiliary storage device 193 can be used to store various programs recorded in the non-transitory computer readable storage medium in mid and long term.

The I/F 194 transmits and receives signals and/or data by wired or wireless means. In the present example embodiment, for example, signals may be output from the I/F 194 to control the switching device. Furthermore, the information exchange apparatus may be provided with, for example, an NIC (Network Interface Card) as the I/F 194, Each of the above functions of the CL information exchange apparatus 210 and the OP information exchange apparatus 310 of the present example embodiment is realized by the CPU 191 loading and executing the programs stored in the auxiliary storage device 193 into the main storage device 192.

The CL shared storage 220 and the OP shared storage 320 may be constructed on the auxiliary storage device 193 of the respective information exchange apparatus. The transmission plan 214, the transmission data, and the access log 314 generated during the processing are stored in the main storage device 192 or the auxiliary storage device 193.

The hardware configuration of the information exchange apparatus is not limited to this. The information exchange apparatus may include hardware not shown. A display or input device may be connected to the I/F 194. The display device is, for example, an LCD monitor. The input device is a device, which accepts user operations, such as a keyboard or mouse, for example.

Programs to realize each of the above functions of the CL information exchange apparatus 210 and the OP information exchange apparatus 310 of the present example embodiment can be recorded on a computer-readable storage medium. The storage medium can be non-transitory, such as a semiconductor memory, a hard disk, magnetic recording media, an optical recording media, etc. The present invention can be implemented as a computer program product.

As described above, according to the information exchange system 100 of the present example embodiment, when registering data to be transmitted to the open environment system 300, the priority is set thereto at the closed environment system 200 side. Then, the data is transmitted considering the priority.

Therefore, according to the information exchange system 100 of the present example embodiment, data for which priority 221e is set high is transmitted preferentially. For example, information that needs to be disclosed urgently can be transmitted and disclosed immediately. This improves convenience.

According to the information exchange system 100 of the present example embodiment, when registering data to be transmitted to the open environment system 300, the access right is registered. On the open environment system 300 side, only authorized users can access the data transmitted. According to the information exchange system 100 of the present example embodiment, security is also ensured because of such access restrictions.

Furthermore, on the open environment system 300 side, access logs to the OP shared storage 320 are accumulated. The access logs are constantly monitored to detect signs of unauthorized access, and when unauthorized access is detected, data transmission from the closed environment system 200 to the open environment system 300 is forcibly stopped. Therefore, according to the information exchange system 100 of the present example embodiment, the protection of information, i.e., security, is further enhanced.

Variation 1

In the above example embodiment, the CL management part 212 drafts a transmission plan 214 each time data is registered. However, the timing for drafting a transmission plan 214 is not limited to this. For example, the CL management part 212 may draft a transmission plan 214 at predetermined time intervals. In this case, the CL management part 212 accesses the CL shared storage 220 at predetermined time intervals, regardless of whether or not new data is registered therein, to draft and update the transmission plan 214 on a basis of a latest registration contents at that time.

Variation 2

When the transmission data is moved to access restriction area 327, the OP management part 312 may be configured to notify a user and/or a terminal, which has an access right set for the transmission data, that the transmission data has been registered.

If a terminal ID is registered as the access right 321e, the OP management part 312 notifies the terminal having the terminal ID. On the other hand, if a user ID is registered as the access right 321e, the OP management part notifies the terminal having the terminal ID that is registered in correspondence with the user ID. Note that a terminal ID for notification is registered for each user ID in advance. The OP management part 312 may, for example, notify by e-mail to an e-mail address associated with the user ID.

The OP management part 312 may be configured to also provide information specifying the access restriction area 327 of the access destination when notifying.

This increases the possibility that a target entity (user and/or terminal) having an access right will quickly access the transmitted data. Accordingly, the time of deletion of the data will also be accelerated, thus improving security.

The OP management part 312 may notify a user and/or a terminal having an access right only for data with a priority 221e of "high". In this case, the OP management part 312 adds priority to header items 215 of the transmission data.

Variation 3

In the above embodiment, the OP management part 312 deletes the data in the OP shared storage 320 after a predetermined period has elapsed after a user (or a terminal) having an access right accesses the data in the open environment system 300. However, the timing for deleting data is not limited to this. For example, after a predetermined period has elapsed after transmission from the closed environment system 200 to the open environment system 300, the OP management part 312 may be configured to delete the data, regardless of a presence or absence of access.

In this case, the OP management part 312 calculates and registers the deletion date and time on a basis of the current date and time and the holding period 321f at the time the data is moved to the access restriction area 327. Then, the OP management part 312 refers to the OP shared storage 320 at predetermined time intervals and deletes any data that has reached the deletion date and time. This further enhanced security because data is automatically deleted after a predetermined period, regardless of a presence or absence of access.

Variation 4

In the above embodiment, at the closed environment system 200 side, after data transmission is completed, the transmission completion date and time 221g is registered and the data remains in the CL shared storage 220 as is. However, it is not limited to this. For example, the data may be deleted from the CL shared storage 220 after a predetermined period of time has elapsed after the completion of data transmission. The data may also be moved to a regular storage in the closed network 201 instead of being deleted.

Variation 5

In the above embodiment, when data transmission is completed, i.e., the date and time are registered in the transmission completion date and time 221g, the data thereof is not retransmitted. However, it is not limited to this. For example, if there is no access to the data registered as transmission completed within a predetermined period, it may be configured so that the data is retransmitted. In this case, the management items 221 are provided with an access record (access done flag) 221j additionally, as illustrated in FIG. 9A.

In this case, when there is an access to a certain data from an authorized user at the open environment system 300 side, the open environment system 300 notifies information specifying the certain data (e.g., data number 321a in FIG. 4B thereof) to the closed environment system 200. This notification (access done notification) may be included, for example, in a periodic data transmission from the open environment system 300 to the closed environment system 200. When transmitting data from the open environment system 300 to the closed environment system 200, the OP transmission/reception part 311 opens the network to the closed environment system 200 using the application and stores the data in a temporary area of the CL shared storage 220 in the same manner as performed by the CL transmission/reception part 213.

In the CL information exchange apparatus 210, when the CL transmission/reception part 213 receives a notification that access has been done, it notifies the CL management part 212. Upon receiving it, the CL management part 212 sets the access record 221j to the corresponding data in the CL shared storage 220.

The CL management part 212 accesses the CL shared storage 220 at predetermined time intervals to extract data for which the transmission completion date and time 221g are not yet registered and data for which the access record 221j is not yet registered and re-draft a transmission plan 214 using thereof.

Variation 6

In the above embodiment, the CL management part 212 drafts a transmission plan 214 so that when data with a priority 221e "high" is registered, only such data is transmitted immediately afterwards, however, it is not limited to this. For example, it may be configured so that the data is transmitted in advance until reaching a maximum amount of data that can be transmitted at one transmission from the closed environment system 200 to the open environment system 300.

In addition, the date and time of the periodic transmission may also be shifted.

Examples of updating the transmission plan 214 in these cases are illustrated in FIG. 9B through FIG. 9D. For example, it is assumed that the data transmission period for the periodic transmission is every hour and that if data with a priority 221e "high" is registered, the data will be transmitted one minute thereafter.

Suppose that it was initially planned to transmit the data of C001, C002, etc. at 12:00, as illustrated in FIG. 9B. Here, if new data of C00n with priority "high" is registered at 11:30, the CL management part 212 drafts a transmission plan to transmit data including data of C00n at 11:31, up to the maximum amount of data that can be transmitted. Here, the CL management part 212 drafts a transmission plan to send data of C00n and C001 at 11:30 as illustrated in FIG. 9C. Then, as illustrated in FIG. 9C, the CL management part 212 allocates the remaining data to subsequent periodic transmissions in sequence.

On the other hand, if the date and time of the periodic transmission is also shifted based on the time of 11:31, as illustrated in FIG. 9D, the CL management part 212 drafts a transmission plan 214 so that the periodic transmission will be performed one hour later, two hours later, etc., therefrom.

Variation 7

In the above embodiment, only whether or not to transmit urgently is designated, but the designation of transmission timing of data to be transmitted is not limited to this.

For example, it can be configured to be set in multiple levels. For example, it can be set "high" that transmits immediately after registration, "medium" that transmits within a predetermined waiting time, which is shorter than the interval between periodic transmissions, and others.

Furthermore, for example, it may be configured to designate a time of transmission of the data to be transmitted and register it. Also, it may be configured to be able to set the priority and/or transmission time.

In this case, the CL management part 212 drafts a transmission plan 214 so that data of which transmission time is designated will be transmitted at that time, data with a priority of "high" will be transmitted immediately after registration, and other data will be transmitted periodically.

For example, the other party can be notified of the transmission time in advance through a different means. Conversely, the other party can ask for a convenient time to transmit the data, and the transmission time can be set accordingly. Therefore, according to this variation, the convenience of the accessing party is further improved.

Variation 8

The CL information exchange apparatus 210 and the OP information exchange apparatus 310 do not have to be one-to-one.

In this case, when registering data in the CL shared storage 220, the CL reception part 211 further designates an OP information exchange apparatus 310 of a transmission destination as management items 221. Then, in the CL shared storage 220, a database is created for each OP information exchange apparatus 310 of the transmission destination. The CL management part 212 drafts a transmission plan 214 for each OP information exchange apparatus 310 of the transmission destination. The CL management part 212 adds information to the header items 215 of the transmission data specifying the CL information exchange apparatus 210 of a transmission source.

On the OP information exchange apparatus 310 side, for example, a temporary area 326 may be provided for each CL information exchange apparatus 210 of the transmission source. If the OP monitor part 313 detects any signs of unauthorized access only for data from a particular CL information exchange apparatus 210, it will stop information exchange only with that particular CL information exchange apparatus 210. On the other hand, if the detected unauthorized access signs are not biased toward data from a particular CL information exchange apparatus 210, the OP monitor part 313 will stop information exchange with all CL information exchange apparatus 210.

Although a plurality of steps (processings) is described in order in the flowcharts used in the above description, an execution order of steps performed in each example embodiment is not limited to the order in the description thereof. For example, the order of the illustrated steps can be changed, such as executing the processings in parallel, as long as no substantial problem occurs.

While the example embodiment and variations of the present invention have thus been described, the present invention is not limited thereto. Further variations, substitutions, or adjustments can be made without departing from the basic technical concept of the present invention. For example, the configurations of the network, and the configurations of the elements illustrated in the drawings have been used only as examples to facilitate understanding of the present invention. That is, the present invention is not limited to the configurations illustrated in the drawings.

The above examples of the disclosure can partially or entirely be described as following Supplementary notes, though not limited thereto.

Supplementary Note 1

An information exchange apparatus disposed at a closed network side, including:
- a reception part that accepts to register transmission data to a closed side shared storage, the transmission data being transmitted from the closed network to an open network;
- a management part that drafts a transmission plan of the transmission data registered; and
- a transmission part that stores the transmission data registered in an open side shared storage according to the transmission plan, the open side shared storage being disposed at the open network side.

The open network is a network in which an access source is not limited.

The closed network has an air gap relative to the open network and is a network in which an access source is limited.

A priority for transmission timing is set on the transmission data registered in the closed side shared storage.

The management part drafts the transmission plan considering the priority.

Supplementary Note 2

In the closed side information exchange apparatus described in above supplementary note,
the management part preferably drafts the transmission plan so that the transmission data whose priority is set high is transmitted immediately after registration.

Supplementary Note 3

An information exchange system, including:
- the information exchange apparatus described in any one of above supplementary notes, and
- an open side information exchange apparatus disposed at the open network system side.

An access right that specifies a target entity to which access to the transmission data is allowed is further set for the transmission data to be registered.

The open side information exchange apparatus includes an open side management part that controls an access for the transmission data stored in the open side shared storage, in accordance with the access right.

Supplementary Note 4

In the information exchange system described in any one of above supplementary notes,
the open side management part preferably moves the transmission data stored in the open side shared storage to an area that can be accessed only by an access source who has the access right to the area, in accordance with the access right.

Supplementary Note 5

In the information exchange system described in any one of above supplementary notes, it is preferably further including a monitor part that detects an occurrence of an unauthorized access on a basis of the access right.

The open side management part preferably records access logs.

The monitor part preferably detects the occurrence of the unauthorized access by monitoring the access logs, and if the monitoring part detects the occurrence of the unauthorized access, the monitor part preferably causes to stop transmitting the transmission data from the information exchange apparatus to the open side information exchange apparatus.

Supplementary Note 6

In the information exchange system described in any one of above supplementary notes,
the open side management part preferably deletes the transmission data from the open side shared storage after a predetermined period of time has elapsed after the transmission data is stored in the open side shared storage.

Supplementary Note 7

An information exchange method, wherein information is exchanged between a closed network and an open network executed by one or more computers,
the method including:
- drafting a transmission plan for a transmission data registered in a closed side shared storage disposed at the closed network side, the closed side shared storage being registered with the transmission data to be transmitted from the closed network to the open network; and
- storing the transmission data to an open side shared storage disposed at the open network side, in accordance with the transmission plan.

The open network is a network in which an access source is not limited.

The closed network has an air gap relative to the open network and is a network in which an access source is limited.

A priority for transmission timing is set on the transmission data registered in the closed side shared storage.

The transmission plan is drafted on a basis of the priority.

Supplementary Note 8

In the information exchange method described in above supplementary note,
  an access right that specifies a target entity to which access to the transmission data is preferably allowed is further set for the transmission data to be registered.
  The information exchange method preferably further includes
  controlling an access for the transmission data stored in the open side shared storage, in accordance with the access right.

Supplementary Note 9

In the information exchange method described in any one of above supplementary notes, preferably further including:
  storing access logs to the transmission data stored in the open side shared storage, the access logs including success or failure of the access based on the access right;
  detecting an occurrence of an unauthorized access, in accordance with the access logs stored; and
  causing to stop transmitting the transmission data from the closed network to the open network, if the occurrence of the unauthorized access is detected.

Supplementary Note 10

A program causing a computer disposed at a closed network side to execute processings comprising:
  drafting a transmission plan for a transmission data registered in a closed side shared storage disposed at the closed network side, the closed side shared storage being registered with the transmission data to be transmitted from the closed network to the open network; and
  storing the transmission data to an open side shared storage disposed at the open network side, in accordance with the transmission plan.
  The open network is a network in which an access source is not limited.
  The closed network has an air gap relative to the open network and is a network in which an access source is limited.
  A priority for transmission timing is set on the transmission data registered in the closed side shared storage.
  The transmission plan is drafted on a basis of the priority.

Supplementary Note 11

An open side information exchange apparatus, including:
  an open side management part that controls an access for data in accordance with an access right set for the data, the data being stored in an open side shared storage disposed at an open network side from a closed network.
  The access right is information that specifies a target entity to which access to the data is allowed and is set at the closed network side.

The open network is a network in which an access source is not limited.

The closed network has an air gap relative to the open network and is a network in which an access source is limited.

Supplementary Note 12

An information exchange method, wherein information is exchanged between a closed network and an open network executed by one or more computers,
  the method including:
  controlling an access for data in accordance with an access right set for the data, the data being stored in an open side shared storage disposed at an open network side from a closed network.
  The access right is information that specifies a target entity to which access to the data is allowed and is set at the closed network side.
  The open network is a network in which an access source is not limited.
  The closed network has an air gap relative to the open network and is a network in which an access source is limited.

Supplementary Note 13

A program causing a computer disposed at an open network side to execute processings comprising:
  controlling an access for data in accordance with an access right set for the data, the data being stored in an open side shared storage disposed at an open network side from a closed network.
  The access right is information that specifies a target entity to which access to the data is allowed and is set at the closed network side.
  The open network is a network in which an access source is not limited.
  The closed network has an air gap relative to the open network and is a network in which an access source is limited.

The disclosure of Non-Patent Literature 1 is incorporated herein by reference thereto. Variations and adjustments of the example of the disclosures and examples are possible within the scope of the overall disclosure (including the claims) of the present invention and based on the basic technical concept of the present invention. Various combinations and selections (including non-selection) of various disclosed elements (including the elements in each of the claims, examples, drawings, etc.) are possible within the scope of the claims of the present invention. Namely, the present invention of course includes various variations and modifications that could be made by those skilled in the art according to the overall disclosure including the claims and the technical concept. Particularly, any numerical ranges disclosed herein should be interpreted that any intermediate values or subranges falling within the disclosed ranges are also concretely disclosed even without explicit recital thereof.

REFERENCE SIGNS LIST

100: information exchange system
191: CPU
192: main storage device
193: auxiliary storage device
194: I/F 195: timer
200: closed environment system
201: closed network
210: CL information exchange apparatus
211: CL reception part
212: CL management part
213: CL transmission/reception part
214: transmission plan
214a: transmission scheduled date and time
214b: transmission scheduled data
215: header item
215a: file name
215b: file size
215c: access right
215d: holding period
220: CL shared storage
221: management item
221a: data number
221b: registration date and time
221c: file name
221d: file size
221e: priority
221f: transmission scheduled date and time
221g: transmission completion date and time
221h: access right
221i: holding period
221j: access record
240: transmission plan storing part
300: open environment system
301: open network
310: OP information exchange apparatus
311: OP transmission/reception part
312: OP management part
313: OP monitor part
314: access log
314a: access date and time
314b: access area
314c: access person and/or access terminal
314d: propriety
320: OP shared storage
321: management item
321a: data number
321b: reception date and time
321c: file name
321d: file size
321e: access right
321f: holding period
321g: access record
326: temporary area
327: access restriction area
340: access log storing part

What is claimed is:

1. An information exchange system in which information is exchanged between a closed network and an open network, comprising:
a closed side information exchange apparatus disposed in the closed network, and
an open side information exchange apparatus disposed in the open network, wherein
the open network is a network in which an access source is not limited,
the closed network has an air gap relative to the open network and is a network in which an access source is limited, and
the closed side information exchange apparatus comprises:
at least one processor; and
a memory in circuit communication with the processor,
wherein the at least one processor of the closed side information exchange apparatus is configured to execute program instructions stored in the memory of the closed side information exchange apparatus to implement:
a reception part that accepts to register transmission data to a closed side shared storage, the transmission data being transmitted from the closed network to the open network;
a closed side management part that drafts a transmission plan of the transmission data registered; and
a transmission part that stores the transmission data registered, in an open side shared storage according to the transmission plan, the open side shared storage being disposed in the open network, wherein
a priority for transmission timing and an access right are set on the transmission data registered in the closed side shared storage, the access right specifying a target entity to which access to the transmission data is allowed,
the management part drafts the transmission plan considering the priority, and
the transmission plan includes a table in which the data to be transmitted is registered for each scheduled transmission date and time, wherein
the open side information exchange apparatus comprises:
at least one processor; and
a memory in circuit communication with the at least one processor, and
wherein the at least one processor of the open side information exchange apparatus is configured to execute program instructions stored in the memory of the open side information exchange apparatus to implement:
an open side management part that controls an access for the transmission data stored in the open side shared storage, in accordance with the access right.

2. The information exchange system according to claim 1, wherein
the open side management part moves the transmission data stored in the open side shared storage to an area that can be accessed only by an access source who has the access right to the area, in accordance with the access right.

3. The information exchange system according to claim 1, wherein
the at least one processor of the open side information exchange apparatus is configured to execute the program instructions stored in the memory of the open side information exchange apparatus to further implement:
a monitor part that detects an occurrence of an unauthorized access on a basis of the access right, wherein
the open side management part records access logs,
the monitor part detects the occurrence of the unauthorized access by monitoring the access logs, and if the monitoring part detects the occurrence of the unauthorized access, the monitor part causes to stop transmitting the transmission data from the information exchange apparatus to the open side information exchange apparatus.

4. The information exchange system according to claim 1, wherein the open side management part deletes the transmission data from the open side shared storage after a predetermined period has elapsed after the transmission data is stored in the open side shared storage.

5. The information exchange system according to claim 1, wherein
the closed side management part drafts the transmission plan so that the transmission data whose priority is set high is transmitted immediately after registration.

6. The information exchange system according to claim 5, wherein
the open side management part moves the transmission data stored in the open side shared storage to an area that can be accessed only by an access source who has the access right to the area, in accordance with the access right.

7. The information exchange system according to claim 5, wherein
the at least one processor of the open side information exchange apparatus is configured to execute the program instructions stored in the memory of the open side information exchange apparatus to further implement:
a monitor part that detects an occurrence of an unauthorized access on a basis of the access right, wherein
the open side management part records access logs,
the monitor part detects the occurrence of the unauthorized access by monitoring the access logs, and if the monitoring part detects the occurrence of the unauthorized access, the monitor part causes to stop transmitting the transmission data from the information exchange apparatus to the open side information exchange apparatus.

8. The information exchange system according to claim 5, wherein
the open side management part deletes the transmission data from the open side shared storage after a predetermined period has elapsed after the transmission data is stored in the open side shared storage.

9. An information exchange method, wherein information is exchanged between a closed network and an open network executed by a closed side computer of a closed side information exchange device disposed in the closed network and an open side computer of an open side information exchange device disposed in the open network, wherein
the open network is a network in which an access source is not limited,
the closed network has an air gap relative to the open network and is a network in which an access source is limited,
the method comprising:
drafting, by the closed side computer, a transmission plan for a transmission data registered in a closed side shared storage disposed in the closed network, the closed side shared storage being registered with the transmission data to be transmitted from the closed network to the open network;
storing, by the closed side computer, the transmission data to an open side shared storage disposed in the open network, in accordance with the transmission plan; and
controlling, by the open side computer, an access for the transmission data stored in the open side shared storage, wherein
a priority for transmission timing and an access right are set on the transmission data registered in the closed side shared storage, the access right specifying a target entity to which access to the transmission data is allowed,
the transmission plan includes a table in which the data to be transmitted is registered for each scheduled transmission date and time, and is drafted on a basis of the priority, and
the access for the transmission data stored in the open side shared storage is controlled in accordance with the access right.

10. The information exchange method according to claim 9, further comprising:
storing, by the open side computer, access logs to the transmission data stored in the open side shared storage, the access logs including success or failure of the access based on the access right;
detecting, by the open side computer, an occurrence of an unauthorized access, in accordance with the access logs stored; and
causing, by the open side computer, to stop transmitting the transmission data from the closed network to the open network, if the occurrence of the unauthorized access is detected.

11. The information exchange method according to claim 9, wherein
the transmission plan is drafted so that the transmission data whose priority is set high is transmitted immediately after registration.

* * * * *